UNITED STATES PATENT OFFICE.

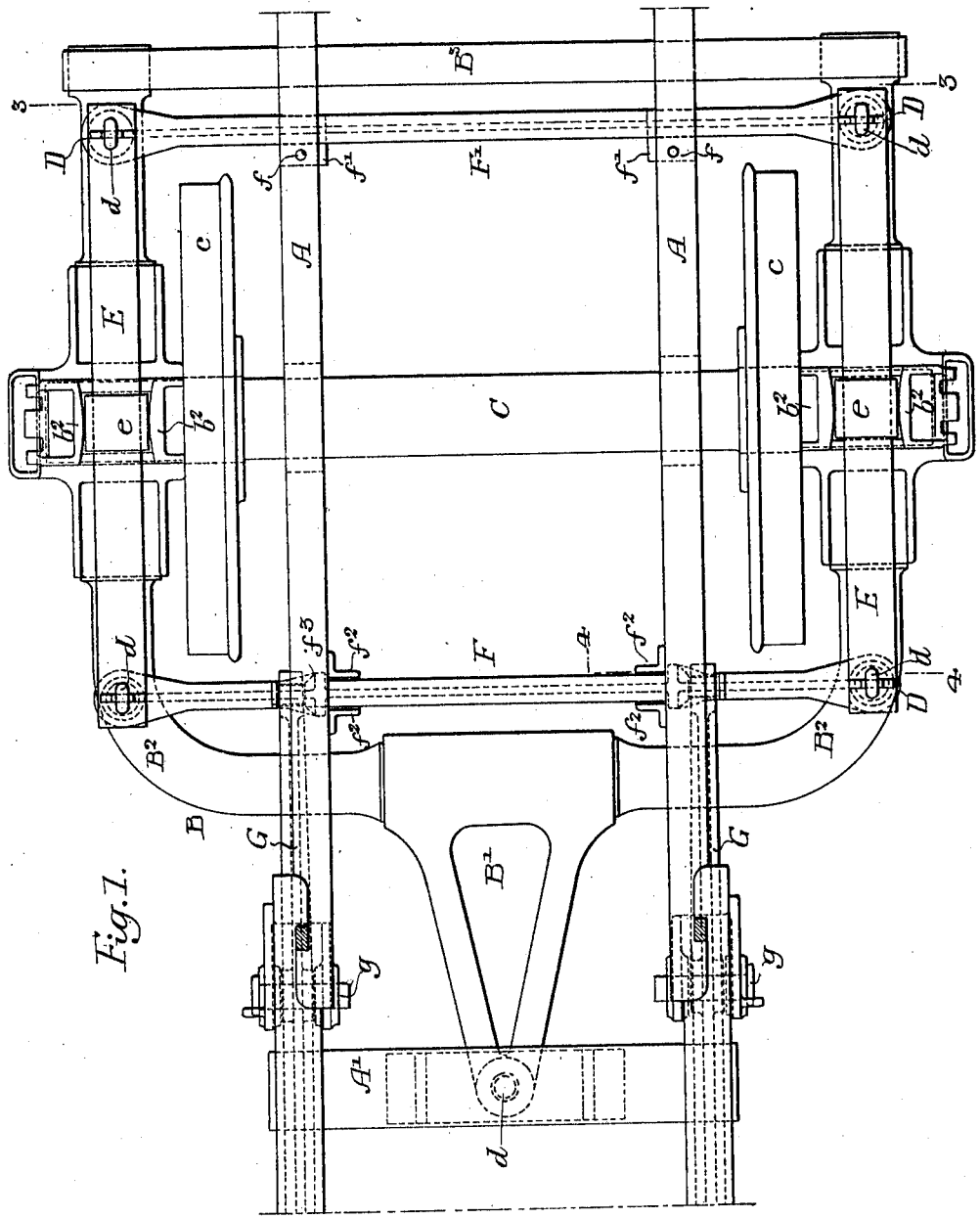

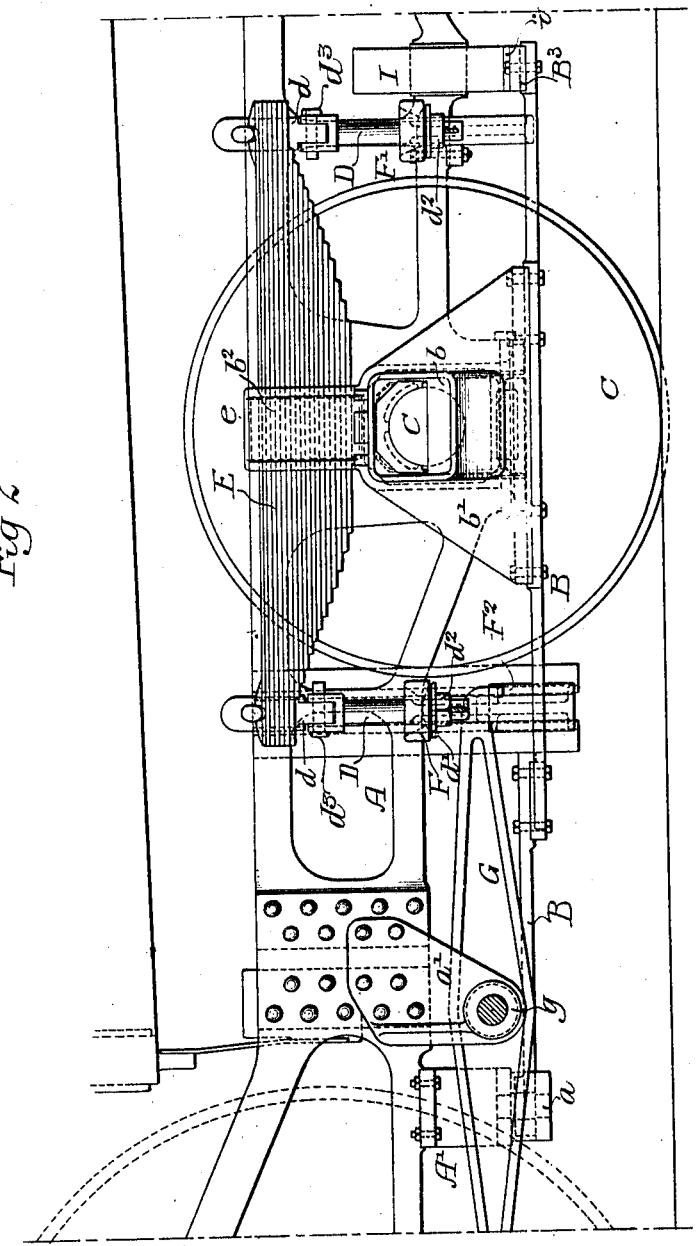

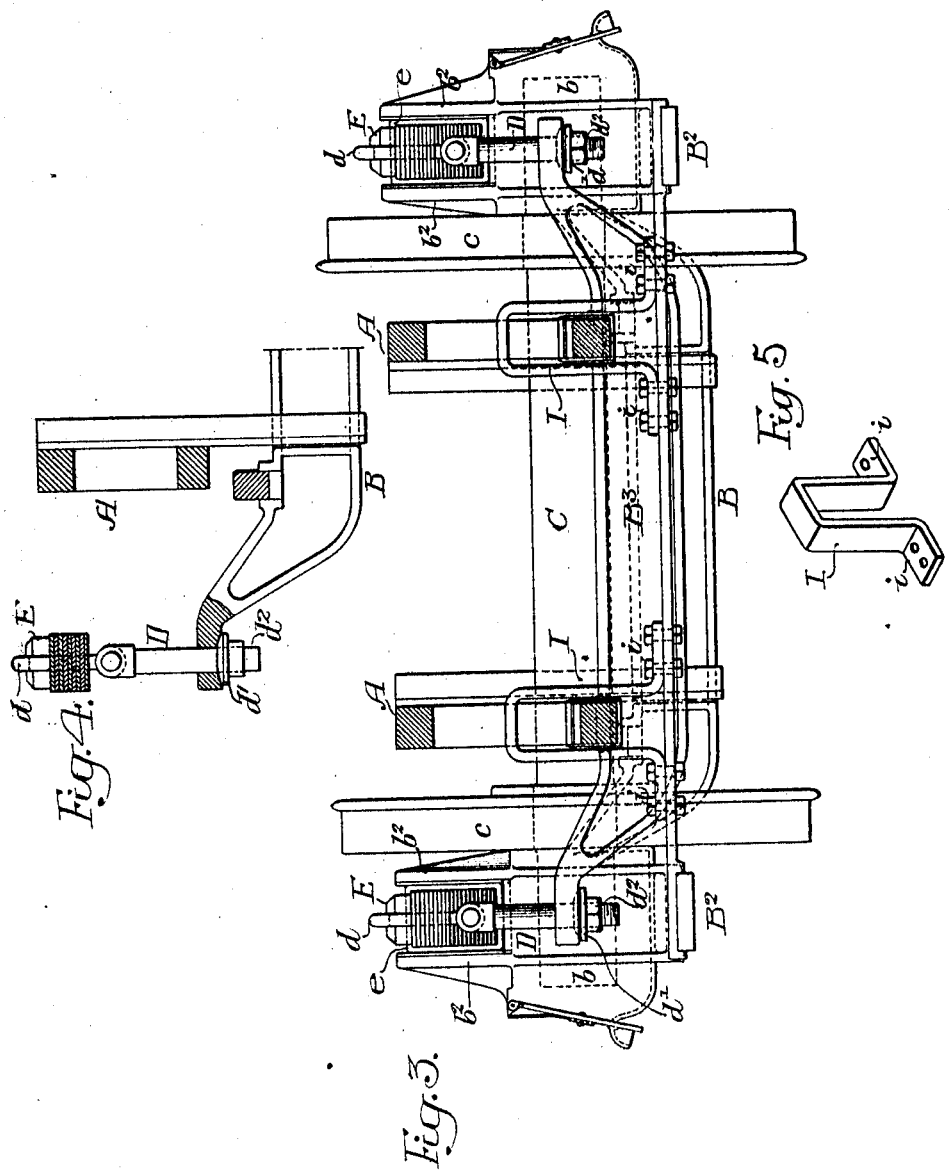

WILLIAM S. HODGES, OF PHILADELPHIA, PENNSYLVANIA, ASSIGNOR, BY MESNE ASSIGNMENTS, TO BALDWIN LOCOMOTIVE WORKS, OF PHILADELPHIA, PENNSYLVANIA, A CORPORATION OF PENNSYLVANIA.

LOCOMOTIVE TRAILER-TRUCK.

970,333.

Specification of Letters Patent. Patented Sept. 13, 1910.

Application filed April 3, 1909. Serial No. 487,643.

*To all whom it may concern:*

Be it known that I, WILLIAM S. HODGES, a citizen of the United States, residing in Philadelphia, Pennsylvania, have invented certain Improvements in Locomotive Trailer-Trucks, of which the following is a specification.

My invention relates to certain improvements in rear swing or trailing trucks of locomotives, and one object of the invention is to so construct the truck that it can be either allowed to swing or be rigidly connected to the main frame of the locomotive as desired, and a further object of the invention is to provide means whereby the truck can swing without affecting the position of the springs in respect to the main frame.

My invention relates further to details which will be fully described hereinafter, reference being had to the accompanying drawings, in which:—

Figure 1, is a plan view of my improved rear swing truck, illustrating my invention; Fig. 2, is a side view; Fig. 3, is a transverse sectional view on the line 3—3, Fig. 1; Fig. 4, is a transverse sectional view on the line 4—4, Fig. 1; and Fig. 5, is a view of one of the clamping irons.

A—A are the main frames of the locomotive, A' is a cross member connected to the two frames, B is the rear swing truck, having a forward extension B' pivoted at $a$ to the cross member A' of the main frame.

The two side members $B^2$ of the swing truck extend rearwardly and are connected together by a cross member $B^3$. C is the axle having wheels $c$—$c$ and this axle is mounted in a box $b$ formed in a casting $b'$ secured to each side member $B^2$ of the frame.

Projecting from each box are uprights $b^2$ having curved inner faces, and mounted upon each box between the uprights is a spring E coupled to vertical rods D—D by links $d$ pivoted to the rods at $d^3$, the pivots being arranged longitudinally in respect to the spring. The rods D—D pass through openings in the transverse bars F—F', and the under sides of these bars are recessed for the reception of curved socket plates $d'$ mounted on the bar D and held in place by the nuts $d^2$. The bar F' is secured to the main frame A by bolts $f$, which pass through lugs $f'$ projecting from the bar as clearly illustrated in Fig. 1, while the bar F is adapted to slide between angle plates $f^2$ mounted on the main frames A—A, as illustrated in Fig. 1.

On the bar F are lugs $f^3$ which rest against the plates $f^2$ and prevent the bar moving longitudinally but allowing for free vertical movement. On each side of the engine frame are equalizing levers G pivoted at $g$ to a bracket $a'$. One arm of each lever rests upon the bar F and the other arm extends to and is connected with the main equalizing gear of the locomotive.

By confining the center band $e$ of the spring between the two uprights $b^2$, having curved inner surfaces, the truck can swing without materially affecting the position of the springs E—E, in respect to the main frame, the pivoted rods D allowing the springs to move toward and from the main frame without tilting. The springs are mounted outside of the wheels C—C, thus leaving the space between the wheels clear.

When it is desired to prevent the rear truck from swinging, I secure two U-shaped irons I, having flanges $i$ to the cross beam $B^3$, and these irons extend over the lower member of each side frame A, giving just sufficient play to the truck to allow its wheels to run freely on the track. By simply detaching these two irons I—I, the truck will be converted immediately into a swing truck. The reason for this construction is that in some instances it is desirable to have a swing truck on the locomotive, so that the locomotive will travel freely on given sections of road, then again it may be preferable to connect the rear swing truck, so as to prevent it from swinging. By simply providing the connections illustrated, the locomotive can be readily converted from one type to another.

I claim:—

1. The combination of a main frame of a locomotive, a rear swing truck frame pivoted at its forward end to the main frame of the locomotive, an axle and wheels carried by the truck frame, and means for clamping the swing truck frame to the main frame.

2. The combination of a main frame of a locomotive, a rear swing truck frame pivoted thereto, boxes carried by the frame of the swing truck, an axle mounted in the boxes, springs supported by the boxes and means for connecting the springs together, an equalizing gear connected to the springs, the boxes having uprights with curved inner walls, within which the springs are mounted.

3. The combination of a main frame of a locomotive, a rear swing truck frame pivoted thereto, boxes on the swing truck frame, an axle mounted in the boxes, springs pivotally mounted upon the boxes, suspension rods coupled to the ends of the springs, cross bars attached to the suspension rods, and equalizing levers connected to one of said cross bars.

4. The combination of a main frame of a locomotive, a rear swing truck frame pivoted thereto, boxes in the frame, an axle mounted in the boxes, springs mounted on the boxes, suspension rods and links pivoted to the rods and coupled to the ends of the springs, cross bars having sockets at their ends, curved plates mounted on the suspension rods and adapted to the sockets in the bars, and equalizing mechanism connected to one of said bars.

5. The combination of a main frame of a locomotive, a rear swing truck frame pivoted at its forward end to the main frame, an axle and wheels carried by the truck frame, springs mounted on each side of the swing truck outside the main frames, two transverse bars one attached to each end of each spring, one of said bars being rigidly connected to the main frame, the other having a free vertical movement but held against longitudinal movement, and equalizing levers connected to the last mentioned bar.

6. The combination of the main frame of a locomotive, a truck frame having boxes, springs mounted on the boxes, forward and rear transverse bars, the rear bar being secured to the main frame and connected to the rear end of each spring, the forward bar being mounted in guides on the main frame so that it can move vertically but held against longitudinal movement, connections between said bar and the forward end of each spring and equalizing means connected to the forward bar.

7. The combination of the main frame of a locomotive, a rear spring truck frame pivoted at its forward end to the main frame, an axle, wheels carried by the axle, springs adapted to swivel on the boxes, two transverse bars coupled one to each end of each spring, the rear bar being secured to the main frame, the forward bar being so coupled to the main frame as to prevent it moving longitudinally, but free to move vertically, and equalizing means resting upon the forward bar.

In testimony whereof, I have signed my name to this specification, in the presence of two subscribing witnesses.

WILLIAM S. HODGES.

Witnesses:
Wm. E. Shupe,
Wm. A. Barr.